Jan. 11, 1966  J. HICKMAN  3,228,294
MISSILE TRANSPORTING AND LAUNCHING PAD
Filed July 9, 1962  4 Sheets-Sheet 1
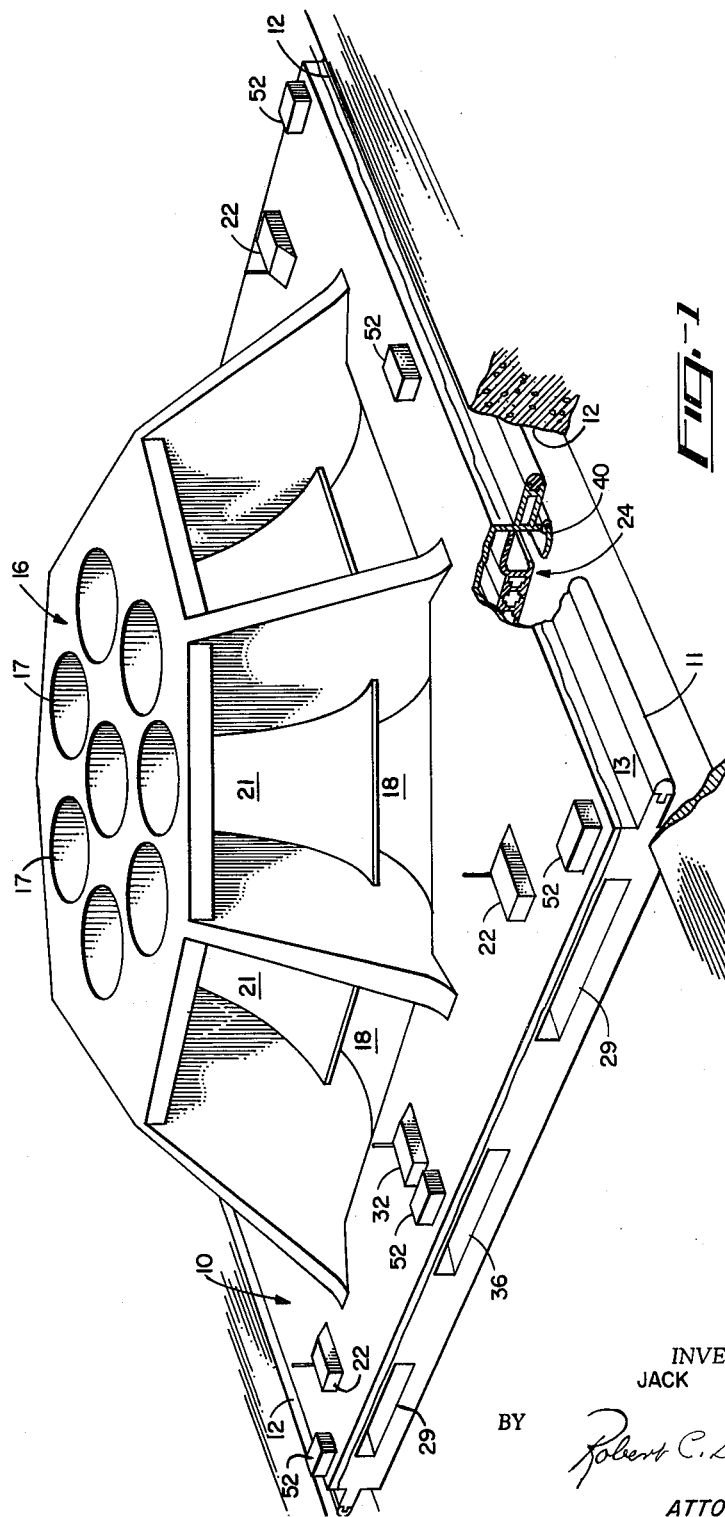
INVENTOR.
JACK HICKMAN
BY
*Robert C. Brown*
ATTORNEY

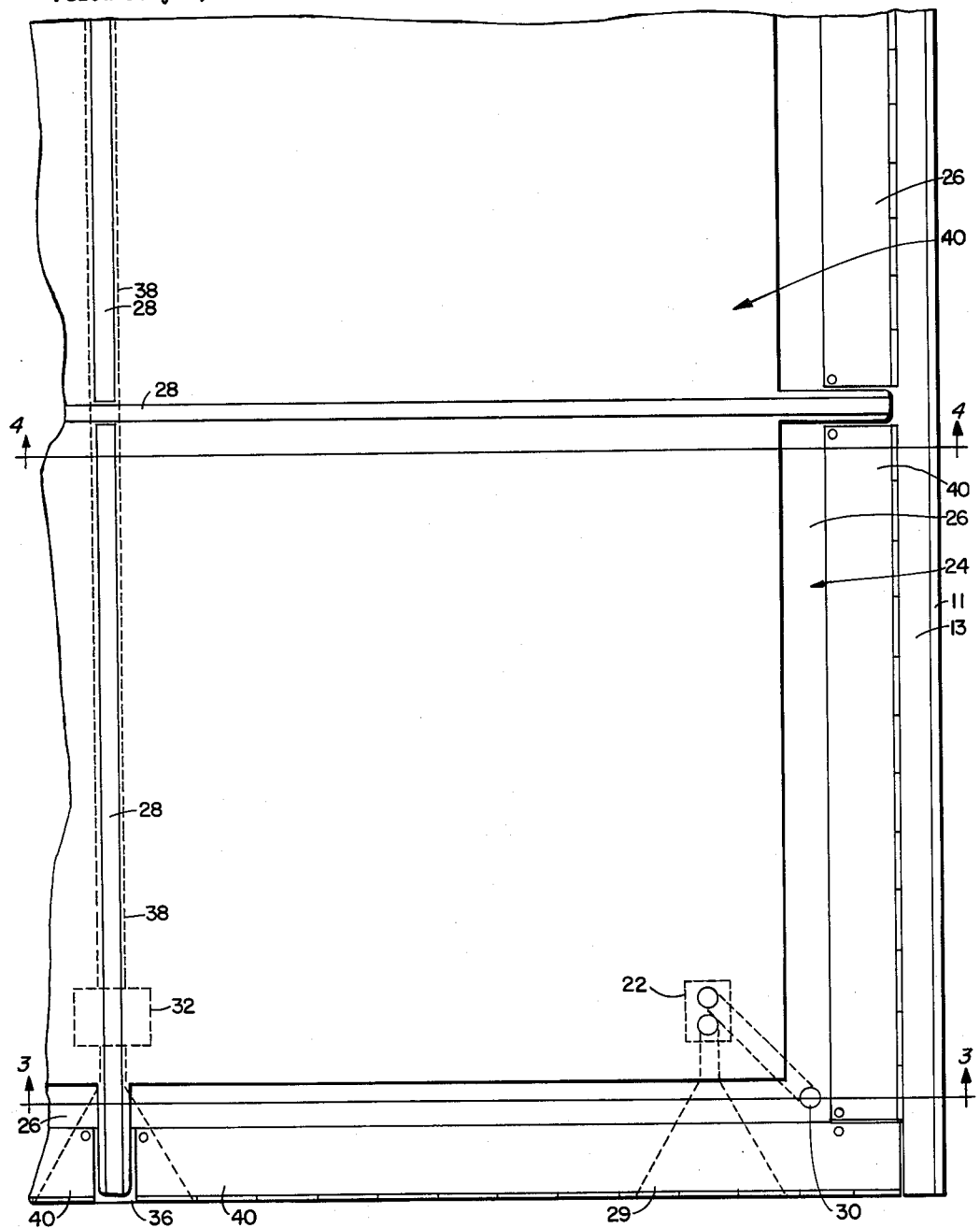

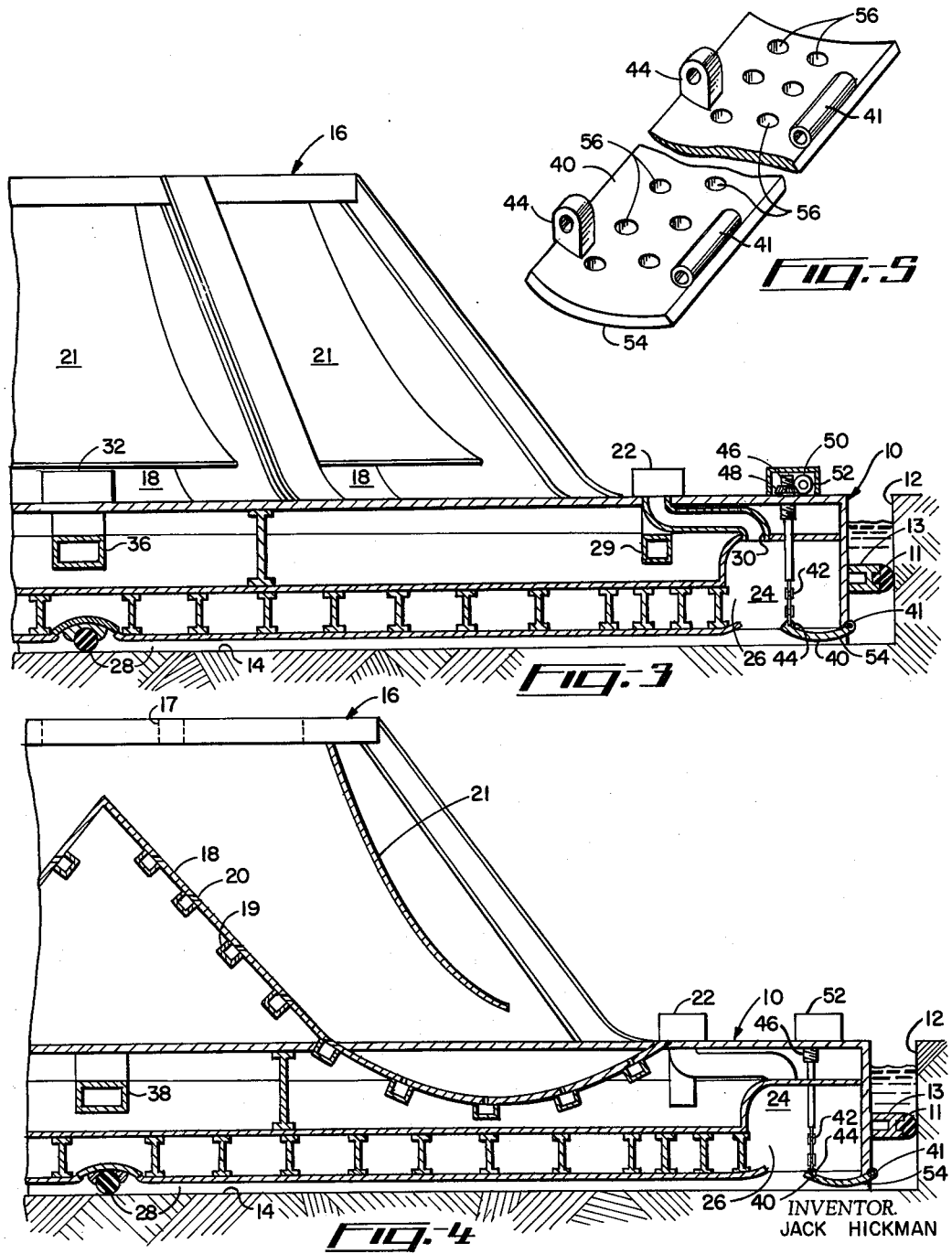

United States Patent Office 3,228,294
Patented Jan. 11, 1966

3,228,294
MISSILE TRANSPORTING AND LAUNCHING PAD
Jack Hickman, Carmichael, Calif., assignor to Aerojet-General Corporation, Azusa, Calif., a corporation of Ohio
Filed July 9, 1962, Ser. No. 208,441
1 Claim. (Cl. 89—1.7)

This invention relates generally to a system for moving massive loads and, in particular, to a system for moving extremely heavy aerospace vehicles over relatively flat terrain.

In recent times the need for an economical and efficient system for transporting and launching kilo-ton size space vehicles has become of great importance. Today, space vehicles having a weight in the order of 10 million pounds must be moved from assembling areas to launching areas. However, no practical solution to the problem of moving these vehicles has been offered. It has been proposed that these massive vehicles be moved by rail or highway transportation; however, in a railway system the number of wheels and massive carriage structure for carrying the massive loads and the resulting deflection of the tracks under the loads would render such a system impractical. Moreover, the cost of the large number of wheels and the undercarriage systems of the rail cars required for supporting the missiles would be excessive. Highway transportation would also be impractical because of the extremely high cost which would be involved in providing a road bed of sufficient bearing capacity to support these massive loads. Barge and channel systems have also been proposed; however, they have the disadvantage that they lack the pitch and roll stability required to adequately support an upstanding space vehicle. Moreover, the cost per mile of constructing a canal system would be extremely high.

Therefore, it is the primary object of the present invention to provide an economical system for the transport of massive loads in the kilo-ton range over relatively flat terrain.

Another object of the present invention is to provide a system for the conveyance of massive loads over land of low soil bearing capacity with a minimum of subsurface improvements.

A further object of the present invention is to provide an integrated assembly serving as a transport vehicle and launching pad for extremely heavy rocket systems.

In its principal aspect the present invention comprises a platform which is supported on a relatively flat supporting surface, the surface being either the bottom of a fluid-filled channel or a roadway with a fluid-filled channel running parallel thereto. Pump means are provided on the platform for continuously pumping fluid from the channel to a plenum or chamber formed in the lower surface of the platform to provide pressure to raise the platform off the supporting surface. Once the platform is raised, fluid from the plenum will return to the channel so that it may be recirculated to the pumps, thereby providing a closed fluid flow system. In order to stabilize the platform when pitched or rolled by outside forces such as wind or unevenly distributed loads, the plenum is divided into a plurality of sectors, there being a pump associated with each of the sectors. Each pump is so designed that it will supply additional fluid pressure to the particular sector which closely approaches the supporting surface in response to the outside force thus providing sufficient pressure to overpower the force and stabilize the platform. Also, the platform is provided with a missile launching platform and flame deflector plates so that a missile may be launched directly from the platform which carries the missile from one site to another.

Other objects, aspects, and advantages will become apparent from the following description in connection with the accompanying drawings, wherein:

FIGURE 1 is a perspective view, with portions broken away, of the preferred embodiment of the present invention;

FIGURE 2 is a partial bottom plan view of the platform illustrated in FIGURE 1;

FIGURE 3 is a section taken on line 3—3 in FIGURE 2;

FIGURE 4 is a section taken on line 4—4 in FIGURE 2;

FIGURE 5 is a fragmentary perspective view of the vertical sealing means of the invention;

Figure 6:
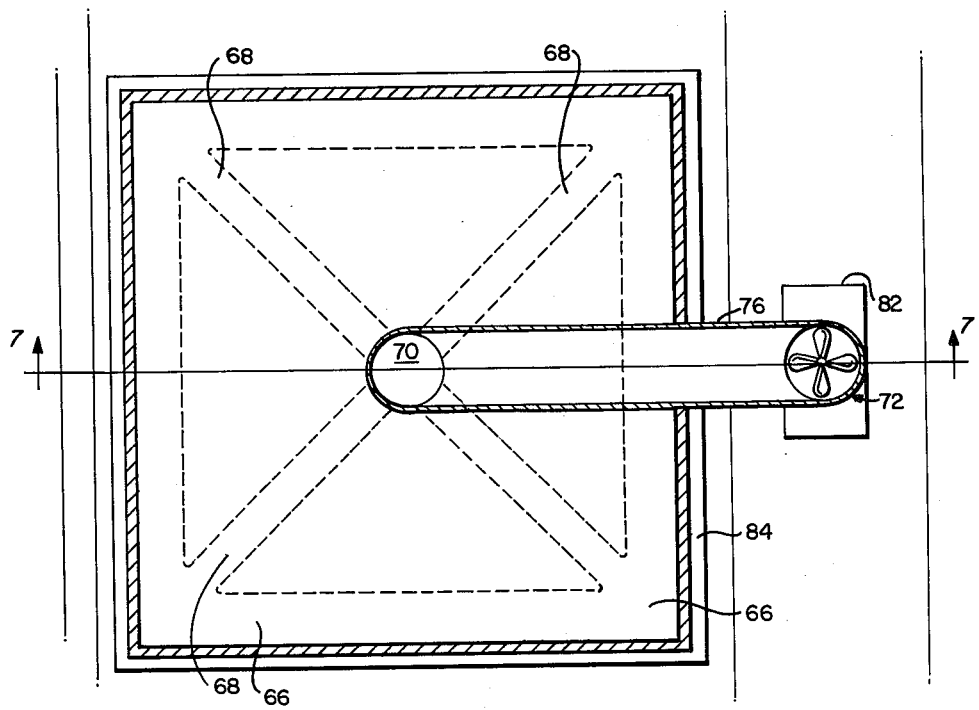
FIGURE 6 is a sectional view taken on line 6—6 of FIGURE 7 showing an additional embodiment of the present invention.

Referring now to FIGURES 1 to 4 in detail, there is shown a platform 10 lying in a fluid-filled channel 12, the bottom of the channel providing a relatively flat supporting surface 14 for the platform. The supporting surface 14 may be constructed by normal building techniques, the soil bearing capacity existing in most locations being adequate for the purposes of this system. The fluid in channel 12 is preferably water but any other incompressible fluid could be used.

A rubber bumper 11 mounted on a lateral extension 13 on the sides of the platform adjacent the walls of channel 12 serves to maintain a proper clearance between the movable platform and the channel walls.

On the upper surface of the platform 10 there is provided a missile launching platform 16 having openings 17 therein through which exhaust from a missile may flow and will be deflected off deflector plates 18 away from the platform. Preferably, the deflector plates are provided with a plurality of channels 19 on their undersides as seen in FIGURE 4 which carry a supply of water pumped thereto by any suitable pumping means, not shown. The water will flow to the channels 19 and out through water holes 20 to the outer surface of the deflector plates for the purpose of cooling the latter. Shielding plates 21 may also be utilized to control the flow of gases from a missile. Since the missile launching platform 16 is located directly on the load conveying platform 10, a missile may be positioned on the platform 16 in an assembly area and may be moved to a launching site by the movable platform 10 in a manner to be described later and the missile will not have to be removed from the platform 10 once it reaches the launching site. This obviously avoids the requirement of elaborate cranes and hoist systems required for moving missiles from conveying devices used today once the missile reaches its launching site. However, it should be appreciated that the load carrying platform 10 of the present invention may be utilized to convey massive loads other than missiles and, therefore, in such applications a missile launching platform 16 with deflector plates 18 would not be required.

In order to raise the platform 10 off the supporting surface 14 when it is under a massive load so that it may be moved along the surface 14, there is provided a pumping system for pumping the fluid in the channel 12 to the lower surface of the platform so that the platform will be supported by a static water head pressing against the bottom surface thereof. The pumping system comprises a plurality of engine-driven pumps 22 located adjacent the four corners of the square platform 10. However, it should be understood that the platform may be rectangular, circular, or any other convenient shape and, in such cases, the pumps 22 should be symmetrically located about the platform. As most clearly seen in FIGURE 2, the lower surface of the platform 10 is shaped to provide a plenum or chamber 24 around its outer perimeter. The plenum is divided into four sectors, each indicated by numeral 26, by suitable resilient sealing members 28. Although four sectors are shown it should be understood that any number could be provided. The sealing members 28 are biased downwardly by springs, not shown, toward the surface 14 of channel 12 so that the sectors 26 will remain divided even when the platform 10 is lifted off supporting surface 14. It is noted that the sectors are equal in number to the number of pumps provided.

Associated with each pump 22 and sector 26 is a pump inlet 29, shown in dotted lines in FIGURE 2, opening through the side of the platform 10 and a pump outlet 30 which opens into each sector of the plenum 24. Hence, it can be appreciated that water may be pumped from the channel 12 through the pump inlets 29 and through the outlets 30 to the plenum 26 so that fluid pressure may be created under the platform to provide a lifting force therefor. It will, of course, be understood that when sufficient water is pumped to the plenum 26 to raise the platform 10, some of the water will return to the channel 12 by flowing under the bottom edge of the platform. However, the pumping system will recirculate this water to maintain the required pressure under the platform.

The pumps 22 should be designed to supply sufficient pressure to the plenum 26 until the pressure exceeds the unit load pressure on the platform so that the major frictional contact between the bottom of the platform and the surface 14 of the channel will be eliminated. The pump pressure required and the size of the platform is selected with major consideration for the soil bearing capacity of the surface 14. If, for example, a soil bearing force of 1000 pounds per square foot is a design limit then the maximum pump pressure would be seven pounds per square inch which, it is noted is equivalent to 16 feet of draft for a floating barge. Therefore, if the platform is loaded with a missile weighing, for example 10 million pounds and the platform itself weighs 4 million pounds, a total of 14 million pounds, the minimum pressurized surface would then be 14 thousand square feet or in other words the dimension of the platform would be 120 feet by 120 feet. The soil compaction and surface preparation required of the supporting surface 14 may be minimized by making a judicious selection of the platform size and pump pressure utilized.

Preferably, the pumps 22 should have the characteristics of producing greater fluid pressure in response to reduced fluid flow so that the pumps will supply a greater fluid pressure to a particular sector 26 in response to reduced fluid flow from the sector as will occur when the platform 10 is subjected to an overturning moment. In this manner, the greater fluid pressure from the pumps will balance the forces from the overturning moment and thereby stabilize the platform. A centrifugal type pump has this characteristic as does an axial flow pump to some degree. It should be appreciated, however, that any other type of pump might be used if suitable indicating means and control devices were provided to sense the distance between the surface 14 and bottom of the platform 10 and correspondingly increase the pressure output of the pump.

Additional pumps 32 and 34 at each end of the platform 10 are provided for purposes of providing propulsion to move the platform in the channel 12. An inlet 36 is provided with each pump 32 and 34 and a longitudinal channel 38, shown in dotted lines in FIGURE 2, is provided so that the pumps 32 and 34 may force fluid through the platform to provide movement in either the forward or rear direction. Preferably the pumps 32 and 34 will be of the axial flow type and may be controlled by any suitable means, not shown. It should be appreciated, however, that the platform 10 may be moved in the channel 12 by any other suitable means such as motor vehicles running along side the channel 12 and connected to the platform by suitable tie wires.

In order to control the amount of water flowing from the plenum 26 back into the channel 12 when the pumps 22 are operating, a plurality of plate 40 are provided about the lower perimeter of the platform 10 and extend inwardly therefrom, there being two of such plates provided for each sector 26. As best seen in FIGURE 3 the plates 40 are pivotally mounted by hinges 41 to the bottom edge of the platform 10 and include chains 42 connected to brackets 44 at each end of the plates. The chains extend upward through the platform 10 and are connected to screws 46. The screws are threadedly received by worm gears 48 which may be rotated by suitable synchronous motors 50 mounted in housings 52, there being one of such motors, worm gears, and screws provided for each chain 42 at each end of the plates 40. The motors 50 may be controlled by any suitable means and function to turn the worm gears 48 thereby displacing the screws 46 whereby the chains 42 connected to the bottom of the screws will raise or lower the plates 40 depending on which direction the motor is rotating. Generally, the screws 46 are positioned so that the plates 40 will have their lower surfaces positioned below the bottom of the platform when the latter is raised above the supporting surface 14.

When the pumps 22 are not operating, contact and loading between the bottom of the platform 10 and the supporting surface 14 varies because of irregularities in their surfaces. When the pumps are intially operating, water pressure is increased until the innerface loading between the surfaces becomes increasingly uniform. With additional increases in pressure by the pumps 22 additional areas of the innerface will separate until a floating condition is obtained wherein the innerface surfaces are free from contact except at the sealing members 28 and sealing plates 40, the latter remaining in contact with the surface 14 until the travel limit of the chains 42 is reached. The travel of the pivoted control or sealing plates 40 is designed to exceed the height of the innerface interference, that is, the bottom of the plates 40 will remain in contact with the surface 14 although the bottom of the platform 10 is floating above that surface. Thus, there is insured a sealing means for the platform so that sufficient pressure may be retained in the plenum 26 to permit the platform to remain raised above the surface 14 during the floating condition. It can be appreciated that the ability of the platform to tolerate deflections and irregularities due to the provision of the sealing plates 40 allows conventional ship building and road building techniques to be used.

Once the pump speeds are increased beyond the point of floating, the increase in water flow and floatation pressure lifts both the platform 10 and sealing plates 40 clear of the bottom of the channel 12. There is then no physical contact between the platform and the surface 14. This is the swimming condition for the platform and the output of the pumps 22 is adjusted to maintain the plates 40 an average of one inch or so above the surface 14 by equalizing the pump flow rate with the rate of leakage of water from the plenum 24 into the channel 12. Once the platform is in its swimming condition it is possible that an overturning moment caused by a wind load against a missile or an unevenly distributed load on the platform may occur which would cause a roll or pitch of the platform. Since the plenum 24 is divided into four sectors 26 and the centrifugal-type pumps 22 have the characteristic of producing greater fluid pressure in response to reduced fluid flow, stabilization of the platform 10 may be obtained. For example, if the sealing plates 40 on the lee half of the platform approach or contact the bottom surface 14 of the channel 12 the rate of flow of fluid from the sector 26 on that side will be reduced. Correspondingly, the pressure output of the centrifugal pump associated with that sector will increase with virtually no change in the speed of the pump, and the increased pressure will raise the side of the platform which was tilted toward the surface 14 until the entire platform is level. The opposite effect occurs on the windward side of the platform where the water flow increases and the pressure will be reduced by the pump on that side. The seals 28 which divide the plenum 24 into four sectors are important for pitch and roll stability, since they separate the sectors so that an automatic control of fluid to each different sector may be obtained by the particular pump 22 and sealing plates 40 associated with the sector.

It is preferable, although not essential, that the sealing plates 40 disposed about the perimeter of the platform 10 be shaped to provide a curved lower surface 54 so that the plates may easily ride over any irregularities on the supporting surface 14 in the bottom of the channel 12. However, having a curved configuration has a disadvantage in that the rate of leakage flow of water from the sector 26 out of the bottom of the platform 10 will increase due to the venturi configuration between the curved surface 54 of the plate 40 and the relatively flat surface 14. In order to compensate for the increased flow of fluid which will occur due to this configuration, openings 56 are provided in the plate 40 to cause a turbulence in the flow of the water underneath the plate and thereby decrease the venturi effect caused by the curved plate.

Figure 7:
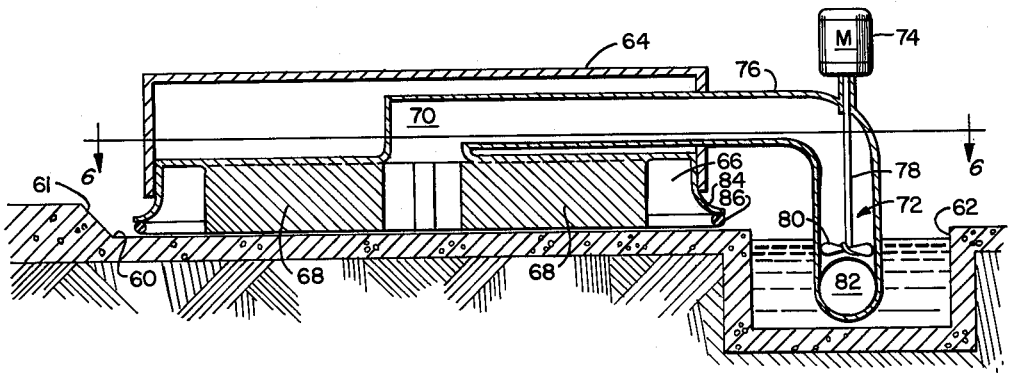
FIGURE 7 is a sectional view taken on line 7—7 of FIGURE 6.

A more simplified embodiment of the invention is shown in FIGURES 6 and 7 of the drawings. As seen best in FIGURE 7 a relatively flat roadway or supporting surface 60 is provided having a shoulder 61 and a water containing channel 62 extends the length of and in the same direction as the roadway. The platform 64 in this embodiment is provided with a plenum 66 in its lower surface. The plenum is connected through passages 68 to an outlet 70 of a pump generally designated at 72. The pump 72 includes a motor 74 mounted on a tubular extension 76 which has its end extending into the channel 62. The motor 74 is connected to a shaft 78 having an impeller 80 at its end. A cylindrical scoop 82 is mounted on the end of the extension 76 so that water may flow through the scoop and be lifted by the impeller 80 through the extension 76 to the outlet 70 and from the outlet through passages 68 to the plenum 66. The sealing means for the plenum 66 of this embodiment comprises spring arms 84 running along the four sides of the platform 64 and having resilient seals 86, the spring arms 84 tending to urge the seals 86 against the surface 60 of the road bed.

As in the embodiment of the invention shown in FIGURES 1–5, water is pumped from the water channel 62 to the plenum 66 until sufficient pressure is developed to raise the platform off the surface 60 and the seals 86 are raised slightly off the surface. Water then will flow past the seals back into the channel 62 since the shoulder 61 on the side of the roadway opposite the channel will prevent the flow of water in that direction. Also, as in the prior embodiment, it should be appreciated that a closed fluid flow system is provided in that water is continuously pumped from a water containing channel to a plenum formed on the lower side of the platform and from the plenum past a sealing means back into the channel. Although the channel 62 shown in FIGURE 6 is positioned at the side of the road bed 60 it is to be understood that it can also be positioned underneath the platform 64. However, in such a system shoulders would have to be provided on either side of the roadway 60 so that water flowing from the plenum 66 will return to the water channel.

Instead of providing a water channel adjacent to the roadway of the platform, it is contemplated that a platform similar to that shown in FIGURES 6 and 7 could be surrounded by a second outer plenum which would carry the supply of fluid for raising the platform. With such an arrangement, a pump could be provided for pumping fluid from the outer plenum to the inner plenum to raise the platform off the roadway and fluid will then leak from the inner plenum back into the outer plenum so that a closed fluid flow cycle is provided.

It will, of course, be understood that various other changes can be made in the form details, arrangement, and proportions of the various parts without departing from the spirit and scope of the invention as defined by the appended claim.

I claim:

A device for transporting heavy loads over a relatively flat supporting surface comprising a platform for carrying a heavy load, a missile launching pad on said platform, flame deflecting plates in the upper surface of said platform operatively connected to said launching pad, a plenum formed in the lower surface of said platform at the perimeter thereof, sealing means dividing said plenum into four equal sectors, said sealing means being adapted to extend below the lower surface of said platform into contact with the supporting surface when said platform is raised off the supporting surface, a centrifugal pump hydraulically connected with each of said sectors having inlet means and outlet means, each of said inlet means being positioned adjacent the side of a sector and each of said outlet means opening into a sector, said centrifugal pumps having the capacity to pump sufficient fluid to said sectors to raise said platform off a supporting surface, a plurality of plates pivotally mounted to the lower outer surface of said platform and extending the length of each of said sectors, and means for adjusting the height of each of said plates.

References Cited by the Examiner
UNITED STATES PATENTS

| | | | |
|---|---|---|---|
| 936,395 | 10/1909 | Worthington | 180—7 |
| 2,925,013 | 2/1960 | Santora et al. | 89—1.7 |
| 3,014,410 | 12/1961 | Anderson | 89—1.7 |
| 3,039,550 | 6/1962 | Beardsley | 180—7 |
| 3,055,446 | 9/1962 | Vaughen | 180—7 |
| 3,066,753 | 12/1962 | Hurley et al. | 180—7 |
| 3,082,836 | 3/1963 | Billman | 180—7 |

FOREIGN PATENTS 893,715    4/1962    Great Britain.

BENJAMIN A. BORCHELT, *Primary Examiner.*

ARTHUR M. HORTON, SAMUEL W. ENGLE,
*Examiners.*